US012684284B2

(12) United States Patent
Yuan et al.

(10) Patent No.: US 12,684,284 B2
(45) Date of Patent: Jul. 14, 2026

(54) VIBRATION SENSORS

(71) Applicant: SHENZHEN SHOKZ CO., LTD., Shenzhen (CN)

(72) Inventors: Yongshuai Yuan, Shenzhen (CN); Wenjun Deng, Shenzhen (CN); Wenbing Zhou, Shenzhen (CN); Yujia Huang, Shenzhen (CN); Fengyun Liao, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 81 days.

(21) Appl. No.: 18/323,396

(22) Filed: May 24, 2023

(65) Prior Publication Data

US 2023/0300519 A1 Sep. 21, 2023

Related U.S. Application Data

(63) Continuation of application No. PCT/CN2021/113419, filed on Aug. 19, 2021.

(30) Foreign Application Priority Data

Jul. 2, 2021 (CN) ......................... 202110751143.6
Aug. 11, 2021 (WO) ................ PCT/CN2021/112017

(51) Int. Cl.
*H04R 1/28* (2006.01)
*H04R 1/08* (2006.01)
*H04R 7/04* (2006.01)

(52) U.S. Cl.
CPC ............. *H04R 1/2807* (2013.01); *H04R 1/08* (2013.01); *H04R 7/04* (2013.01)

(58) Field of Classification Search
CPC ........ H04R 1/2807; H04R 1/045; H04R 1/00; H04R 1/08; H04R 1/42; H04R 7/04; H04R 2460/13
(Continued)

(56) References Cited

U.S. PATENT DOCUMENTS 4,885,781 A 12/1989 Seidel
5,940,347 A 8/1999 Raida et al.
(Continued)

FOREIGN PATENT DOCUMENTS

CN 104300831 A 1/2015
CN 106454651 A 2/2017
(Continued)

OTHER PUBLICATIONS

International Search Report in PCT/CN2021/113419 mailed on Mar. 28, 2022, 7 pages.
(Continued)

*Primary Examiner* — Ahmad F. Matar
*Assistant Examiner* — Sabrina Diaz
(74) *Attorney, Agent, or Firm* — METIS IP LLC

(57) ABSTRACT

Embodiments of the present disclosure provide a vibration sensor. The vibration sensor may include a transducer; and a vibration component connected with the transducer, wherein the vibration component may be configured to transmit an external vibration signal to the transducer to generate an electrical signal, and include one or more plate structures and one or more mass blocks physically connected with each of the one or more plate structures; and the vibration component may be further configured to make a sensitivity of the vibration sensor greater than a sensitivity of the transducer within one or more target frequency bands.

14 Claims, 12 Drawing Sheets

1300

(58) Field of Classification Search
USPC .......................... 381/150, 151, 152, 161, 162
See application file for complete search history.

(56) References Cited

U.S. PATENT DOCUMENTS

| | | | | |
|---|---|---|---|---|
| 9,661,411 | B1 | 5/2017 | Han et al. | |
| 11,662,248 | B2 | 5/2023 | Yuan et al. | |
| 12,072,228 | B2 | 8/2024 | Yuan et al. | |
| 2004/0140415 | A1 | 7/2004 | Watson | |
| 2006/0219016 | A1 | 10/2006 | Wang et al. | |
| 2009/0211838 | A1 | 8/2009 | Bilan | |
| 2011/0266919 | A1 | 11/2011 | Ikehara et al. | |
| 2013/0276541 | A1 | 10/2013 | Busch et al. | |
| 2014/0119577 | A1 | 5/2014 | Gao et al. | |
| 2015/0377693 | A1 | 12/2015 | Rose | |
| 2016/0316300 | A1* | 10/2016 | Qi | H04R 31/00 |
| 2018/0160209 | A1 | 6/2018 | Ogata et al. | |
| 2019/0335271 | A1 | 10/2019 | Post et al. | |
| 2021/0167275 | A1 | 6/2021 | Kim et al. | |
| 2021/0297782 | A1 | 9/2021 | Nakashima et al. | |
| 2021/0302225 | A1 | 9/2021 | Chen et al. | |
| 2021/0302227 | A1 | 9/2021 | Chen et al. | |
| 2021/0382085 | A1 | 12/2021 | Bretthauer et al. | |
| 2022/0127135 | A1* | 4/2022 | Mogelin | H04R 1/08 |
| 2024/0377243 | A1* | 11/2024 | Yuan | H04R 1/08 |

FOREIGN PATENT DOCUMENTS

| | | | | |
|---|---|---|---|---|
| CN | 108471258 | A | 8/2018 | |
| CN | 208434106 | U | 1/2019 | |
| CN | 110022045 | A | 7/2019 | |
| CN | 209314103 | U | 8/2019 | |
| CN | 209526879 | U | * 10/2019 | H04R 9/02 |
| CN | 209659621 | U | 11/2019 | |
| CN | 110603818 | A | 12/2019 | |
| CN | 110631685 | A | * 12/2019 | G01H 11/06 |
| CN | 111131988 | A | 5/2020 | |
| CN | 111510834 | A | * 8/2020 | H04R 19/00 |
| CN | 111988717 | A | 11/2020 | |
| CN | 212086490 | U | 12/2020 | |
| CN | 212572961 | U | 2/2021 | |
| CN | 112565995 | A | 3/2021 | |
| CN | 212785847 | U | 3/2021 | |
| CN | 112601169 | A | 4/2021 | |
| CN | 213186548 | U | 5/2021 | |
| CN | 213280084 | U | 5/2021 | |
| CN | 213342678 | U | 6/2021 | |
| CN | 216852329 | U | 6/2022 | |
| CN | 115706907 | A | 2/2023 | |
| EP | 1067513 | A1 | 1/2001 | |
| EP | 2505003 | B1 | 1/2020 | |
| JP | H08195995 | A | 7/1996 | |
| WO | 2007111405 | A1 | 10/2007 | |
| WO | 2020000594 | A1 | 1/2020 | |

OTHER PUBLICATIONS

International Search Report in PCT/CN2021/112017 mailed on May 5, 2022, 6 pages.
First Office Action in Chinese Application No. 202110751143.6 mailed on Mar. 20, 2025, 16 pages.
Du, Yangbo, Main Factors Influencing Dynamic Loudspeaker Tone Quality, Audio Engineering, 41(9/10): 45-48, 2017.
The Second Office Action in Chinese Application No. 202110751143.6 mailed on Jul. 10, 2025, 15 pages.
Zhang, Qichang et al., Nonlinear in Vibration Energy Collection Application in The Field, Nonlinear Dynamics and Applications, Tianjin University Press, 2021, 10 Pages.
The Extended European Search Report in European Application No. 21921636.3 mailed on Mar. 27, 2023, 9 pages.
Communication Pursuant to Article 94(3) EPC in European Application No. 21921636.3 mailed on Mar. 24, 2025, 5 pages.
Office Action in Russian Application No. 2022121511 mailed on Mar. 17, 2023, 22 pages.
Ki Woong Seong et al., A Vibro-Acoustic Hybrid Implantable Microphone for Middle Ear Hearing Aids and Cochlear Implants, Sensors, 2019, 14 pages.
Sun, Quansheng, Capacitive MEMS Microphones with a Low-stress Ultra-thin Vibrating Membrane, Full-text Database of Excellent Master's Dissertations in China, 2021, 65 pages.
Fang, Huabin et al., Study of Micro Vibration Pickup Sensor Fabricated by MEMS Technique, Electronic Components & Materials, 25(7): 69-71, 2006.
First Office Action in Chinese Application No. 202180083432.1 mailed on May 22, 2026, 17 pages.

* cited by examiner

200

420

700

1200

VIBRATION SENSORS

CROSS-REFERENCE TO RELATED APPLICATIONS

This application is a continuation of International Application No. PCT/CN2021/113419, filed on Aug. 19, 2021, which claims priority to Chinese Patent Application No. 202110751143.6, filed on Jul. 2, 2021, and International Application No. PCT/CN2021/112017, filed on Aug. 11, 2021, the entire contents of each of which are incorporated herein by reference.

TECHNICAL FIELD

The present disclosure relates to the field of sensors, in particular, to vibration sensors including a vibration component.

BACKGROUND

A vibration sensor is an energy converter device that converts a vibration signal into an electrical signal. The vibration sensor may be used in a microphone (e.g., an air conduction microphone, a bone conduction microphone, etc.), or a monitoring device. The vibration sensor may obtain data such as an amplitude and a direction of a vibration and convert the data into the electrical signal or other necessary forms for further analysis and processing.

The present disclosure provides vibration sensors, which may increase the sensitivity of the vibration sensors without increasing a count of transducers.

SUMMARY

An aspect of the present disclosure provides a vibration sensor. The vibration sensor may include a transducer; and a vibration component connected with the transducer, wherein the vibration component may be configured to transmit an external vibration signal to the transducer to generate an electrical signal, and include one or more plate structures and one or more mass blocks physically connected with each of the one or more plate structures; and the vibration component may be further configured to make a sensitivity of the vibration sensor greater than a sensitivity of the transducer within one or more target frequency bands.

In some embodiments, a frequency response curve of the vibration sensor under an action of the vibration component may include a plurality of resonance peaks.

In some embodiments, the one or more mass blocks connected with each of the one or more plate structures may include at least two mass blocks.

In some embodiments, at least one structural parameter of a plurality of structural parameters of the at least two mass blocks may be different, and the plurality of structural parameters may include a size, a mass, a density, and a shape.

In some embodiments, in a vibration direction of the vibration component, a projection of the one or more mass blocks may be located within a projection of the one or more plate structures.

In some embodiments, the vibration component may further include a supporting structure configured to support the one or more plate structures, the supporting structure may be physically connected with the transducer, and the one or more plate structures may be connected with the supporting structure.

In some embodiments, the support structure may be made of an impermeable material.

In some embodiments, a projection region of the one or more mass blocks may not overlap with a projection region of the supporting structure in a vertical direction with respect to a surface, wherein the one or more plate structures and the one or more mass blocks may be connected at the surface.

In some embodiments, one of the one or more plate structures and at least two mass blocks physically connected with the plate structure may correspond to multiple target frequency bands of the one or more target frequency bands, so that the sensitivity of the vibration sensor may be greater than the sensitivity of the transducer within the multiple target frequency bands of the one or more target frequency bands.

In some embodiments, the plate structure and the at least two mass blocks physically connected with the plate structure may have a plurality of resonance frequencies, and at least one of the plurality of resonance frequencies may be less than a resonance frequency of the transducer, so that the sensitivity of the vibration sensor may be greater than the sensitivity of the transducer within the multiple target frequency bands of the one or more target frequency bands.

In some embodiments, the plurality of resonance frequencies of the plate structure and the at least two mass blocks physically connected with the plate structure may be the same or different.

In some embodiments, a difference between the resonance frequency of the transducer and at least one of the plurality of resonance frequencies of the plate structure and the at least two mass blocks physically connected with the plate structure may be within 1 kHz-10 kHz.

In some embodiments, a difference between two adjacent resonance frequencies of the plurality of resonance frequencies of the plate structure and the at least two mass blocks physically connected with the plate structure may be less than 2 kHz.

In some embodiments, a difference between two adjacent resonance frequencies of the plurality of resonance frequencies of the plate structure and the at least two mass blocks physically connected with the plate structure may be less than 1 kHz.

In some embodiments, a resonance frequency of the plurality of resonance frequencies of the plate structure and the at least two mass blocks physically connected with the plate structure may be within 1 kHz~10 kHz.

In some embodiments, a resonance frequency of the plurality of resonance frequencies of the plate structure and the at least two mass blocks physically connected with the plate structure may be within 1 kHz~5 kHz.

In some embodiments, the plurality of resonance frequencies of the plate structure and the at least two mass blocks physically connected with the plate structure may be related to parameters of at least one of the plate structure and the at least two mass blocks, the parameters including at least one of: a modulus of the plate structure, a volume of a cavity formed between the transducer and the plate structure, radiuses of the at least two mass blocks, heights of the at least two mass blocks, or densities of the at least two mass blocks.

In some embodiments, at least one mass block of the one or more mass blocks connected with one plate structure of the one or more plate structure may be concentric with the plate structure.

In some embodiments, at least one of the one or more plate structures may include a diaphragm.

In some embodiments, the one or more mass blocks connected with the diaphragm may be arranged on one side of the diaphragm facing the transducer, or on another side of the diaphragm facing away from the transducer.

In some embodiments, a material of the diaphragm may include at least one of: polytetrafluoroethylene, expanded polytetrafluoroethylene, polyethersulfone, polyvinylidene fluoride, polypropylene, polyethylene terephthalate, nylon, nitrocellulose, or mixed cellulose.

In some embodiments, in a vibration direction of the diaphragm, a projection region of the one or more mass blocks may be located within a projection region of the diaphragm.

In some embodiments, a count of the one or more mass blocks connected with the diaphragm may be greater than 1, and the one or more mass blocks may be located on both sides of the diaphragm perpendicular to a vibration direction, respectively.

In some embodiments, a count of the one or more mass blocks connected with the diaphragm may be greater than or equal to 3, and the one or more mass blocks may not be arranged collinearly.

In some embodiments, at least one of the one or more plate structures may include a cantilever beam.

In some embodiments, a material of the cantilever beam may include at least one of: copper, aluminum, tin, silicon, silicon oxide, silicon nitride, silicon carbide, aluminum nitride, zinc oxide, lead zirconate titanate, or alloy.

In some embodiments, the one or more mass blocks connected with the cantilever beam may be set at a free end of the cantilever beam.

In some embodiments, the one or more mass blocks connected with the cantilever beam may be collinear with the cantilever beam.

In some embodiments, the transducer may further include a conduction channel; the vibration component may be arranged within the conduction channel along a radial cross-section of the conduction channel; or the vibration component may be arranged on an outer side of the conduction channel.

In some embodiments, the one or more mass blocks connected with one of the one or more plate structures may not be in contact with an inner wall of the conduction channel.

In some embodiments, at least one of the one or more plate structures may be provided with a through hole.

In some embodiments, at least one of the one or more plate structures may not fully cover the conductive channel.

In some embodiments, one of the one or more plate structures that is farthest from the transducer may be provided to enclose the conductive channel.

Another aspect of the present disclosure provides a sound input device. The sound input device may include a vibration sensor according to above embodiments.

Another aspect of the present disclosure provides a vibration system. The vibration system may include a plate structure; a vibration member connected with the plate structure; at least one mass block connected with the vibration member, wherein a projection of the mass block may be located within a projection of the vibration member in a vibration direction of the vibration member.

Another aspect of the present disclosure provides a headphone. The headphone may include a vibration system according to above embodiments.

BRIEF DESCRIPTION OF THE DRAWINGS

The present disclosure is further illustrated in terms of exemplary embodiments, and these exemplary embodiments are described in detail with reference to the drawings. These embodiments are not restrictive. In these embodiments, the same number indicates the same structure, wherein.

DETAILED DESCRIPTION

Figure 1:
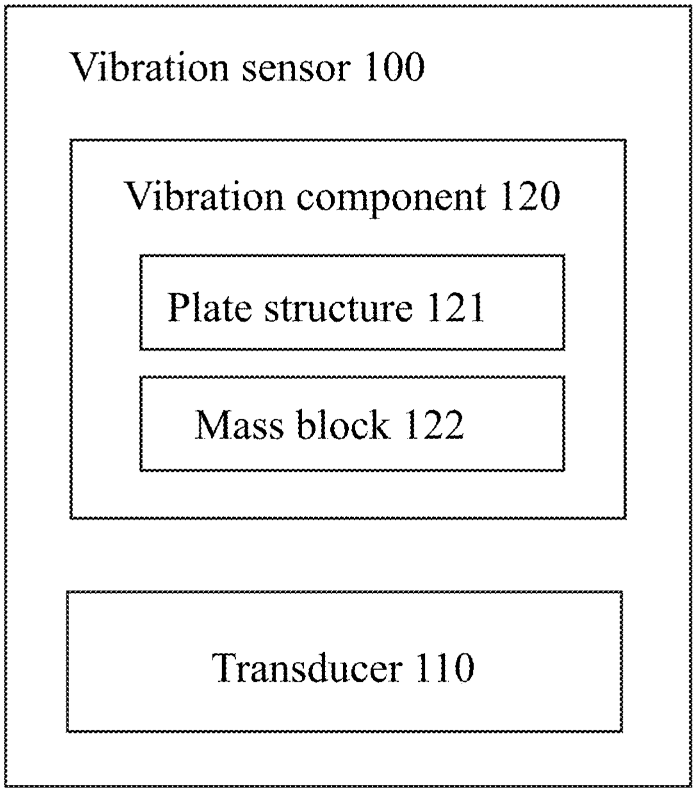
FIG. 1 is a block diagram illustrating an exemplary vibration sensor according to some embodiments of the present disclosure.

In order to illustrate the technical solutions related to the embodiments of the present disclosure, a brief introduction of the drawings referred to in the description of the embodiments is provided below. Obviously, drawings described below are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure and operation.

As shown in the present disclosure and claims, unless the context clearly indicates exceptions, the words “a,” “an,” “one,” and/or “the” do not specifically refer to the singular, but may also include the plural. Generally, the terms “including” and “comprising” only suggest that the steps and elements that have been clearly identified are included, and these steps and elements do not constitute an exclusive list, and the method or device may also include other steps or elements. The term “based on” refers to “at least partially based on”. The term “one embodiment” means “at least one embodiment”. The term “another embodiment” means “at least one other embodiment”. The relevant definitions of other terms will be provided in the following description.

In some embodiments, a device included in a vibration sensor for converting a vibration into an electrical signal may include a transducer. Usually, a transducer only has one resonance peak, and the transducer only has a high sensitivity near a frequency of the resonance peak. In some embodiments, in order to improve the sensitivity of the vibration sensor, a plurality of transducers with different resonance peaks are provided to increase a receiving frequency range and improve the sensitivity of the vibration sensor. However, increasing a count of the transducers may lead to an increase in the volume and a manufacturing cost of the vibration sensor.

Thus, the present disclosure provides a vibration sensor. The vibration sensor may use a vibration component connected with a transducer to make a sensitivity of the vibration sensor greater than a sensitivity of the transducer in a target frequency band. The vibration sensor may be configured to receive an external vibration signal, and convert the external vibration signal into an electrical signal that may reflect sound information. The external signal may include a mechanical vibration signal or other forms of signals. The vibration component may include one or more plate structures and one or more mass blocks physically connected with each of the one or more plate structures. The one or more mass blocks may be arranged on one side of a plate structure. The vibration component may be configured to make the sensitivity of the vibration sensor greater than the sensitivity of the transducer within one or more target frequency bands.

FIG. 1 is a block diagram illustrating an exemplary vibration sensor according to some embodiments of the present disclosure.

As shown in FIG. 1, the vibration sensor 100 may include a transducer 110 and a vibration component 120. In some embodiments, the transducer 110 may be connected with the vibration component 120. The vibration component 120 may be configured to transmit an external vibration signal to the transducer to generate an electrical signal. When a vibration occurs in the external environment, the vibration component 120 may respond to the vibration of the external environment and transmit the vibration signal to the transducer 110, then the transducer 110 may convert the vibration signal into an electrical signal. The vibration sensor 100 may be applied to a mobile device, a wearable device, a virtual reality device, an augmented reality device, or the like, or any combination thereof.

In some embodiments, the transducer 110 may be an acoustic transducer, and the acoustic transducer may include a microphone. Specifically, the microphone may be a microphone with bone conduction as one of the main modes for sound propagation, or may be a microphone with air conduction as one of the main modes for sound propagation. For example, the microphone with air conduction as one of the main modes for sound propagation may obtain a sound pressure change in a conduction channel (e.g., a pickup hole) and convert the sound pressure change into an electrical signal. In some embodiments, the transducer may be an accelerometer. The accelerometer is a specific application of a spring-vibration system that receive a vibration signal through a sensitive device to obtain an electrical signal, and then process the electrical signal to obtain an acceleration. In some embodiments, a working frequency of the accelerometer may be lower than a working frequency of the acoustic transducer.

In some embodiments, a mobile device may include a smartphone, a tablet, a personal digital assistant (PDA), a gaming device, a navigation device, or the like, or any combination thereof. In some embodiments, a wearable device may include a smart bracelet, a headphone, a hearing aid, a smart helmet, a smart watch, a smart clothing, a smart backpack, a smart accessory, or the like, or any combination thereof. In some embodiments, a virtual reality device and/or an augmented reality device may include a virtual reality helmet, a virtual reality glass, a virtual reality patch, an augmented reality helmet, an augmented reality glass, an augmented reality patch, or the like, or any combination thereof. For example, a virtual reality device and/or an augmented reality device may include a Google Glass, an Oculus Rift, Hololens, Gear VR, or the like.

As shown in FIG. 1, the vibration component 120 may include one or more plate structures 121 and one or more mass blocks 122. In some embodiments, each of the one or more plate structures 121 is connected with at least one of the one or more mass blocks 122. The vibration component 120 is configured to make a sensitivity of the vibration sensor 100 greater than a sensitivity of the transducer 110 within one or more target frequency bands. In some embodiments, a structure formed by a plate structure and a mass block physically connected with the plate structure may also be referred to as a resonance structure. The plate structure 121 may refer to a structure made of flexible or rigid materials that may be configured to carry the one or more mass blocks. The mass block 122 is a relatively small and heavy object. In some embodiments, a volume and a mass of the mass block may vary depending on the usage scenario and a target frequency of the vibration component 120. More descriptions may be found elsewhere in the present disclosure, for example, FIG. 2 and FIG. 8, and the relevant descriptions thereof, which are only one embodiment and may not be intended to limit the scope of the present disclosure.

In some embodiments, the plate structure 121 may include a single plate structure (also referred to as a plate component). In some embodiments, the plate structure 121 may include multiple plate components. For example, a count of the plate components may be 2, 3, 4, etc.

In some embodiments, at least one mass block connected with each of the one or more plate structures may include a single mass block. In some embodiments, at least one mass block connected with each of the one or more plate structures may include a plurality of mass blocks. For example, a count of the plurality of mass blocks may be 2, 3, 4, etc.

In some embodiments, at least one of the one or more plate structures 121 may be connected with at least two mass blocks 122.

In some embodiments, the vibration component 120 may further include a supporting structure configured to support the one or more plate structures 121. The supporting structure may be physically connected with the transducer 110, and the one or more plate structures 121 may be connected with the supporting structure.

In some embodiments, the one or more mass blocks 122 may be located on either side of a plate structure 121 in a vibration direction. In some embodiments, the plurality of mass blocks may also be located on both sides of the plate structure 121 in the vibration direction, respectively. In some embodiments, in the vibration direction of the plate structure, a projection of the one or more mass blocks 122 connected with a plate structure may be located within a projection of the plate structure. In some embodiments, a sum of cross-sectional areas of one or more mass blocks 122 on one side of plate structure 121 may be less than a cross-sectional area of the plate structure 121 in a direction parallel to a surface (i.e., a direction perpendicular to the vibration direction), and the plate structures 121 and the one or more mass blocks 122 are connected at the surface. In some embodiments, the one or more mass blocks 122 may be driven by the plate structure 121, and a vibration direction may be the same as the vibration direction of the plate structure 121.

In some embodiments, one or more plate structures 121 and a plurality of mass blocks 122 physically connected with the plate structure may correspond to multiple target frequency bands of the one or more target frequency bands, so that the sensitivity of the vibration sensor 100 is greater than the sensitivity of the transducer 110 within the multiple target frequency bands of the one or more target frequency bands. In some embodiments, a combination of at least one plate structure and a mass block may generate a large amplitude of a vibration signal near a resonance frequency of the combination when the combination receives the vibration signal, thereby improving the sensitivity of the vibration sensor 100.

In some embodiments, a method for measuring the sensitivity of the vibration sensor 100 and the transducer 110 may include: under an excitation of a preset acceleration (e.g., 1 g, where g represents the acceleration of gravity), designating a strength (e.g., (−30) dBV) of the electrical signal of a device as a sensitivity (e.g., (−30) dBV/g). For example, the strength of the electrical signal output by the vibration sensor 100 and the transducer 110 may be acquired to determine the sensitivity of the vibration sensor 100 and the transducer 110 under the same excitation of the acceleration (e.g., 1 g, where g is the acceleration of gravity). In some embodiments, when the transducer 110 is a microphone and when measuring the sensitivity, the excitation may be replaced with sound pressure. Inputting the sound pressure within a specified frequency band (an inputting method of the sound pressure may be bone conduction as the main mode of sound propagation or air conduction as the main mode of sound propagation) as the excitation, and the electrical signal of the device may be measured.

In some embodiments, in order to adapt to multiple vibration modes, the vibration component formed by a plate structure and one or more mass blocks 122 physically connected with the plate structure may have a plurality of resonance frequencies, and the plurality of resonance frequencies may be the same or different. At least one structural parameter of a plurality of structural parameters of at least two mass blocks may be different. The plurality of structural parameters may include a size, a mass, a density, a shape, or the like. Specifically, a size of a mass block may be at least one of a length, a width, a height, a cross-sectional area, or a volume of the mass block.

In some embodiments, a frequency response curve of vibration sensor 100 under the action of vibration component 120 may include a plurality of resonance peaks.

In some embodiments, a difference between at least one resonance frequency of a resonance structure formed by a plate structure and multiple mass blocks physically connected with the plate structure and a resonance frequency of the transducer 100 is within 1 kHz~10 kHz. In some embodiments, a difference between two adjacent resonance frequencies of the plurality of resonance frequencies of the plate structure 122 and the multiple blocks physically connected with the plate structure may be less than 2 kHz. In some embodiments, a difference between two adjacent resonance frequencies of the plurality of resonance frequencies of the plate structure and the multiple blocks physically connected with the plate structure may not be greater than 1 kHz.

In some embodiments, a resonance frequency of the plurality of resonance frequencies of the plate structure and the multiple mass blocks physically connected with the plate structure may be within 1 kHz~10 kHz. In some embodiments, a resonance frequency of the plurality of resonance frequencies of the plate structure and the multiple mass blocks physically connected with the plate structure may be within 1 kHz~5 kHz.

By setting at least one mass block 122 in the vibration component 120, the vibration component 120 may have multiple vibration modes, resulting in two or more resonance peaks in the frequency response curve of the vibration sensor. Due to the increase of the sensitivity of the vibration sensor within a frequency range where a resonance peak is located, two or more resonance peaks included in the frequency response curve may increase a frequency range of high sensitivity of the vibration sensor. The vibration mode may be a vibration state with a fixed frequency, a fixed damping ratio, and a fixed vibration form. Different vibration modes may correspond to different deformation forms, for example, the multiple mass blocks synchronously vibrate upwards; one mass block vibrates upwards, and one mass block vibrates downwards, or the like. The vibration mode may depend on an inherent feature of the vibration component 120, such as a stiffness and a size of a mass block 122, or a size, a position, and a density of a counterweight block. In some embodiments, a mass block may generate one vibration mode, two mass blocks may generate two vibration modes, three mass blocks may generate three effective vibration modes, or two effective vibration modes. An effective vibration mode may refer to a mode that may cause a volume change in an air gap.

In some embodiments, at least one of the one or more plate structures 121 may be a diaphragm. The diaphragm may include a rigid membrane or a flexible membrane. The rigid membrane may be a membrane whose Young's modulus is greater than a first modulus threshold (e.g., 50 GPa). The flexible membrane may be a membrane whose Young's modulus is less than a second modulus threshold. In some embodiments, the first modulus threshold and/or the second modulus threshold may be determined based on actual requirements. In some embodiments, the first modulus threshold may be equal to or unequal to the second modulus threshold. For example, the first modulus threshold may be 20 GPa, 30 GPa, 40 GPa, 50 GPa, etc., and the second modulus threshold may be 1 MPa, 10 MPa, 1 GPa, 10 GPa, etc. The detailed description for the diaphragm may be found elsewhere in the present disclosure, for example, FIG. 2 and the relevant descriptions.

In some embodiments, at least one of the one or more plate structures 121 may be a cantilever beam. The cantilever beam may include a rigid plate. In some embodiments, the rigid plate may refer to a plate whose Young's modulus of the plate is greater than a third modulus threshold (e.g., 50 GPa). In some embodiments, the third modulus threshold may be determined based on actual requirements. For example, the third modulus threshold may be 20 GPa, 30 GPa, 40 GPa, 50 GPa, etc. The detailed description for the cantilever beam may be found elsewhere in the present disclosure, for example, FIG. 8A and the relevant description.

In some embodiments, the one or more plate structures 121 may include at least one diaphragm and at least one cantilever beam. The detailed descriptions for the diaphragm and cantilever beam may be found elsewhere in the present disclosure.

Figure 2:
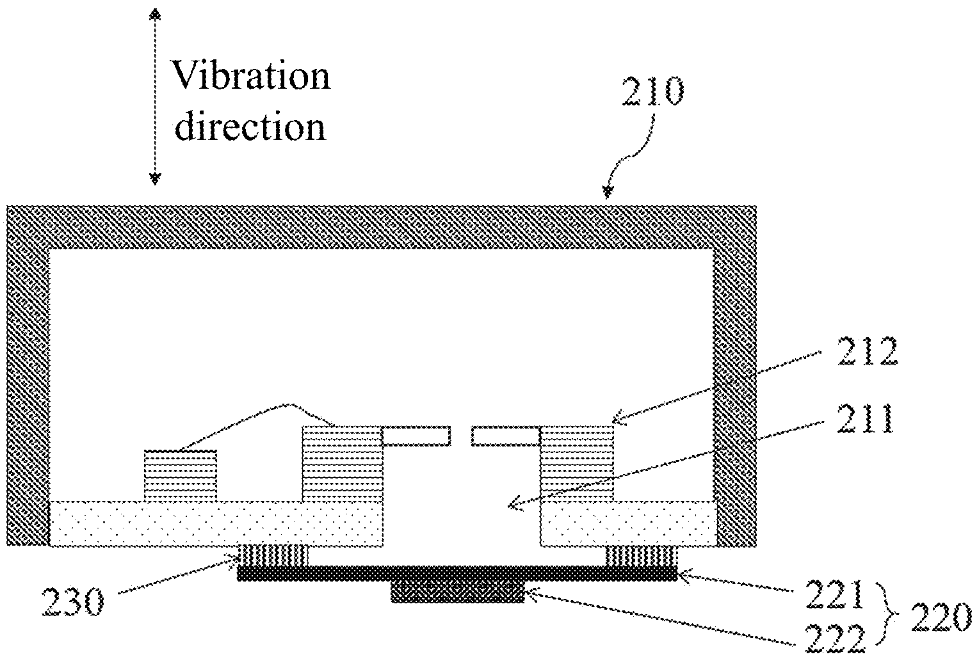
FIG. 2 is a schematic diagram illustrating exemplary structures of a vibration sensor according to some embodiments of the present disclosure.

FIG. 2 is a schematic diagram illustrating exemplary structures of a vibration sensor according to some embodiments of the present disclosure.

The vibration sensor 200 shown in FIG. 2 may be a specific embodiment of the vibration sensor 100 shown in FIG. 1. In some embodiments, the vibration sensor 200 may include an acoustic transducer 210 and a vibration component 220. It should be noted that in some other embodiments, the transducer may be a transducer other than the acoustic transducer, such as an accelerometer. In addition, the acoustic transducer may also be in other forms, such as a liquid microphone, or a laser microphone.

As shown in FIG. 2, in some embodiments, an air conduction microphone may include a pickup device 212. In some embodiments, based on the energy conversion principle, the pickup device 212 may include sensitive elements of transducers in forms of capacitive, piezoelectric, etc., which may not be limited in the present disclosure.

In some embodiments, the acoustic transducer 210 may also have a conduction channel 211 for picking up sound. In some embodiments, the vibration component 220 may be located along a radial cross-section of a pickup hole within the conduction channel 211 or on an outer side of the conduction channel 211 as shown in FIG. 2. The conduction channel 211 may also be referred to as a pickup hole or an inlet hole.

As shown in FIG. 2, the vibration component 220 may include a plate structure and a mass block 222 physically connected with the plate structure. In some embodiments, the plate structure may be connected with the mass block 222 via a way of clamping, bonding, or integrated molding. The connection method may not be limited in the present disclosure. In some embodiments, the plate structure may include a diaphragm 221. In some embodiments, the diaphragm 221 may be provided for breathability or for sealing purposes. For example, in order to provide good sound pickup effect, the diaphragm 221 may be sealed.

It should be noted that the diaphragm and the plate structure shown in the figures is merely for convenience, but may not limit the scope of the present disclosure. In some embodiments, a count of the mass blocks may be multiple, and the multiple mass blocks may be located on both sides of the diaphragm 221, respectively. In some embodiments, the multiple mass blocks may also be located on the same side of the diaphragm 221. For example, assuming that the vibration component includes two or more mass blocks, the two or more mass blocks may be located on both sides of the plate structure, respectively. In some embodiments, the multiple mass blocks may be all located on one side of the diaphragm facing the transducer or on one side of the diaphragm facing away from the transducer to ensure uniform vibration. In some embodiments, the plate structure and the multiple mass blocks physically connected with the plate structure may correspond to multiple target frequency bands in one or more different target frequency bands, so that the sensitivity of the vibration sensor 100 may be greater than the sensitivity of the transducer 210 within the corresponding multiple target frequency bands. In some embodiments, a plurality of resonance frequencies of a plate structure and the plurality of mass blocks 222 physically connected with the plate structure may be the same or different. In some embodiments, the sensitivity of the vibration sensor 100 with one or more mass blocks and a diaphragm may be increased by 3 dB~30 dB compared with the sensitivity of the transducer 110 in a corresponding target frequency band. It should be noted that in some embodiments, the sensitivity of the vibration sensor 200 with the vibration component 220 may be increased by more than 30 dB compared with the sensitivity of the transducer 210, such as the multiple mass blocks 222 physically connected with the plate structure including the same resonance peak.

In some embodiments, the multiple mass blocks may be arranged collinearly or not collinearly. For example, in some embodiments, if a count of the mass blocks is four, two or three of the four mass blocks may be arranged collinearly. As another example, the four mass blocks may also be arranged in arrays (e.g., in a rectangular array, or a circular array).

In some embodiments, when the vibration component 220 includes a plurality of diaphragms, a diaphragm farthest from the acoustic transducer 210 may be provided as permeable to air to ensure that air vibration (e.g., sound waves) may be fully transmitted via the diaphragm and picked up by the pickup device 212, thus to effectively improve the pickup quality. By providing a plate structure farthest from the acoustic transducer 210 into a structure permeable to air, the conduction channel 211 may be closed to prevent air leakage during vibration, ensuring the effect of air compression, and thus enabling the vibration sensor 200 to have a good sound pickup performance.

In some embodiments, a supporting structure 230 may be made of an impermeable material, and the impermeable supporting structure 230 may cause a change of a sound pressure (or cause an air vibration) in the supporting structure 230 during the conduction process of a vibration signal in the air, and cause an internal vibration signal in the supporting structure 230 to be transmitted to the acoustic transducer 220 through the conduction channel 211. During the conduction process, the vibration signal may not be transmitted outward via the supporting structure 230, thereby ensuring a strength of the sound pressure, and improving the sound conduction effect. In some embodiments, the material of the supporting structure 230 may include, but not be limited to metals, alloy materials (e.g., aluminum alloy, chromium molybdenum steel, scandium alloy, magnesium alloy, titanium alloy, magnesium lithium alloy, nickel alloy, etc.), hard plastics, foam, or the like, or any combination thereof.

In some embodiments, a projection region of the mass block may not overlap with a projection region of the supporting structure in a vertical direction (i.e., a direction perpendicular to the vibration direction) with respect to a surface, and the diaphragm 221 and a mass block 222 may be connected at the surface. A vibration of the diaphragm 221 and the mass block 222 being limited by the supporting structure 230 may be avoided. In some embodiments, a shape of a cross-section of the diaphragm in a thickness direction may include a circle, a rectangle, a triangle, or an irregular shape. In some embodiments, a shape of the diaphragm may also be determined based on a shape of the supporting structure 230, which may not be limited in the present disclosure. In some embodiments, to prevent excessive stress concentration at a corner caused by a non-smooth curve, the diaphragm 221 may be determined with a shape of circle. In some embodiments, a shape of the mass block may be a cylinder, a frustum, a cone, a cube, a triangle, etc. A size and a material of the mass block may be described below, which may not be limited in the present disclosure.

In some embodiments, the mass block 222 may be concentric with the diaphragm 221. For example, when the mass block 222 or the diaphragm 221 has a circular outer contour, kinetic energy may be evenly distributed on the diaphragm 221 when the mass block 222 arranged concentrically with the diaphragm 221 is vibrating, thereby enabling the diaphragm 221 to good respond to vibration. In some other embodiments, the mass block 222 may also be set at other positions of the diaphragm 211, such as an eccentric position. The eccentric position may refer to that the mass block is not concentric with the diaphragm. In some embodiments, a distance between a centerline of the mass block 222 and an edge of diaphragm 221 may vary. In some embodiments, the position of the mass block 222 with respect to the diaphragm 221 may be different, and a position of the resonance peak of the vibration system 10 may be adjusted. For example, when the mass block 222 moves from the edge of diaphragm 221 to a center of diaphragm 221, a resonance peak may move forward, that is, the resonance peak may move towards a low-frequency direction (i.e., the resonance frequency may decrease). If the mass block 222 moves from the center of diaphragm 221 to the edge of diaphragm 221, the resonance peak may move backward, that is, the resonance peak may move towards a high-frequency direction (i.e., the resonance frequency may increase).

In some embodiments, when the vibration sensor 200 is configured for conducting air guided pickup, and the vibration is generated from the external environment (e.g., sound waves), the diaphragm 221 and the mass block on the diaphragm 221 may respond to the vibration from the external environment and generate a vibration. The vibration generated by diaphragm 221 and the mass blocks may be combined with a vibration signal from the external environment (e.g., a sound wave) to cause a change of the sound pressure (or an air vibration) within the conduction channel 211, thus causing the vibration signal to be transmitted via the conduction channel 211 to the pickup device 212 and converted into an electrical signal, thereby achieving the process of converting the vibration signal into the electrical signal after strengthening in the one or more target frequency bands. A target frequency band may be a frequency range of a resonance frequency corresponding to the plate structure and the mass block 222. For example, when the vibration sensor 200 is used as a microphone, the target frequency range may be a range between 200 Hz~2 kHz. Specifically, in some embodiments, if the resonance frequency of the acoustic transducer is 2 kHz, the resonance frequency of vibration component 220 may be designated as 800 Hz, 1 kHz, or 1.7 kHz, etc.

In some embodiments, the vibration component 210 may be applied to the design of micro electro mechanical systems (MEMS) or applied to the design of a macroscopic device (e.g., a microphone or a speaker). In technology of MEMS, the diaphragm 221 may be a single-layer material along a thickness direction of the diaphragm 221, such as Si, SiO2, SiNx, SiC, etc., or may be a double-layer or multi-layer composite material, such as Si/SiO2, SiO2/Si, Si/SiNx, SiNx/Si/SiO2, etc. The mass block 221 may be a single-layer material, such as Si, Cu, etc., or a double-layer or multi-layer composite material, such as Si/SiO2, SiO2/Si, Si/SiNx, SiNx/Si/SiO2, etc. In some embodiments, a material of the diaphragm 221 material in the MEMS may be Si or SiO2/SiNx, and a material of the mass block 222 in the MEMS may be Si. When shapes of the diaphragm 221 and the mass block 222 are circular, the radius of the diaphragm 221 may be 500 μm~1500 μm. A thickness of the diaphragm 221 may be 0.5 μm~5 μm. A radius of mass block 222 may be 100 μm~1000 μm. A height of mass block 222 may be 50 μm~5000 μm.

In a macroscopic device, the material of the diaphragm 221 may be a polymer film, such as polyurethane, epoxy resin, acrylic ester, etc., or a metal film, such as copper, aluminum, tin, or other alloys and their composite films. Requirements for the mass block 221 may be a certain amount of mass with a smallest possible volume, thus the material of the mass block 221 may be required a higher density. The material of the mass block 221 may be copper, tin, or other alloys and their composite materials. In the macroscopic device, the radius of the diaphragm 221 may be 1 mm~10 cm, and the thickness of the diaphragm 221 may be 0.1 mm~5 mm. The radius of mass block 221 may be 0.2 mm~5 cm, and the height of the mass block 221 may be 0.1 mm~10 mm. In some embodiments, the radius of the diaphragm 221 may be 1.5 mm~10 mm, and the thickness of the diaphragm 221 may be 0.2 mm~0.7 mm. The radius of the mass block 221 may be 0.3 mm~5 mm, and the height of the mass block 221 may be 0.3 mm~5 mm.

In some embodiments, the diaphragm 221 may include a breathable membrane. The breathable membrane may include polytetrafluoroethylene, expanded polytetrafluoroethylene, polyethersulfone, polyvinylidene fluoride, polypropylene, polyethylene terephthalate, nylon, nitrocellulose, or mixed cellulose, or the like, or any combination thereof. In some embodiments, when the diaphragm 221 is provided as non-breathable, the material of the diaphragm 221 may be a material that is the same with the material of the plate structure or may be obtained by treating the breathable membrane (e.g., covering a breathable hole).

In some embodiments, the diaphragm 221 may be a plate structure with one or more through holes. In some embodiments, an aperture of a through hole may be 0.01 μm~10 μm. Preferably, the aperture of the through hole may be 0.1 μm~5 μm, such as 0.2 μm, 0.5 μm, 0.8 μm, 1 μm, 2 μm, etc. The one or more diameters of the one or more through holes on diaphragm 221 may be the same or different. In some embodiments, if the vibration component 230 includes multiple diaphragms, diameters of through holes on the multiple diaphragms may be the same or different, and the diameter of the through holes on the same diaphragm may be the same or different. In some embodiments, the aperture of the through hole may also be greater than 5 μm. When the aperture of the through hole is greater than 5 μm, other materials (e.g., silicone) may be arranged on the diaphragm 221 to cover a portion of the one more through holes, or cover a portion of a through hole of the one or more through holes without affecting air permeability.

In some embodiments, the vibration component 220 may further include a supporting structure 230 for supporting one or more groups of diaphragms 221 and mass blocks. The supporting structure 230 may be physically connected with the acoustic transducer 230, and the one or more groups of diaphragms 221 and mass blocks may be connected with the supporting structure 230. Specifically, the supporting structure 230 may be connected with a shell of the acoustic transducer 210.

Figure 3:
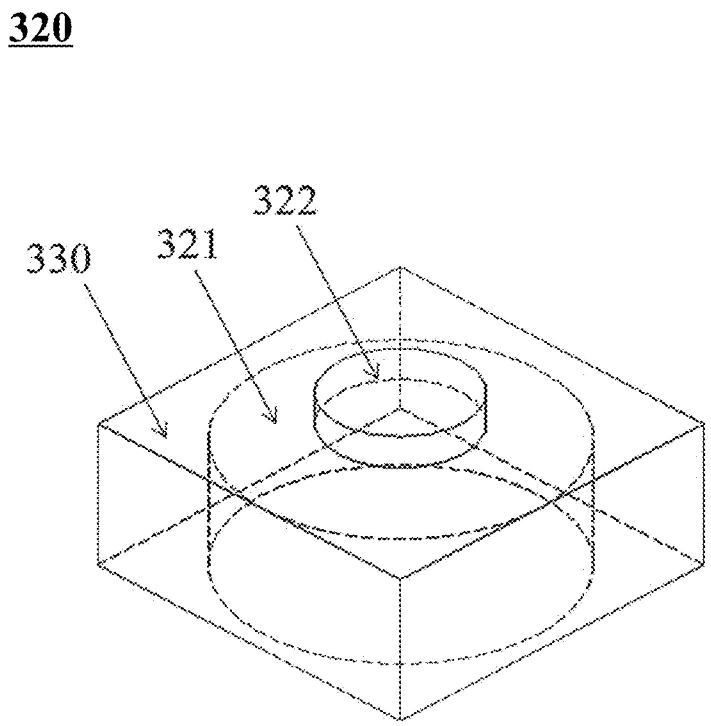
FIG. 3 is a schematic diagram illustrating an exemplary vibration component according to some embodiments of the present disclosure.

FIG. 3 is a schematic diagram illustrating an exemplary vibration component according to some embodiments of the present disclosure.

A vibration component 320 shown in FIG. 3 may be an exemplary embodiment of the vibration component 120 shown in FIG. 1. As shown in FIG. 3, a mass block 322 is arranged on a diaphragm 321.

In some embodiments, a plate structure may be embedded on an inner wall of a supporting structure 330 or embedded within the supporting structure 330. In some embodiments, the plate structure may vibrate in the space inside the supporting structure 230, and the plate structure may completely block an opening of the supporting structure. That is, an area of the plate structure may be greater than or equal to an area of the opening of the supporting structure. This arrangement may allow an air vibration (e.g., a sound wave) from the external environment to be fully picked up through the plate structure, and then a pickup device may be configured to pick up the air vibration to effectively improve the sound pickup quality. In some embodiments, the plate structure may not fully cover the opening of the supporting structure, such as in a situation that the plate structure is a cantilever beam. The detailed described may be found in elsewhere in the present disclosure, for example, FIGS. 8A-8C and the relevant descriptions.

Figure 4A:
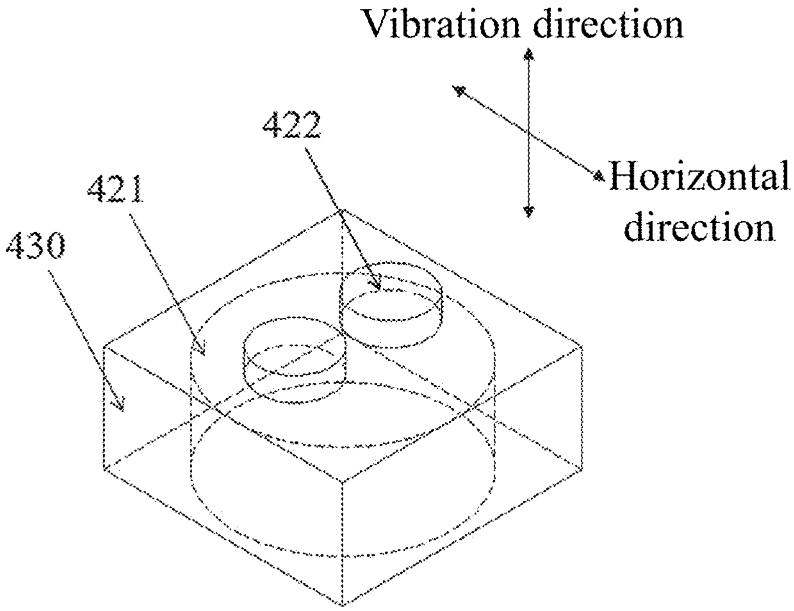
FIG. 4A is a schematic diagram illustrating an exemplary vibration component according to some embodiments of the present disclosure.
Figure 4B:
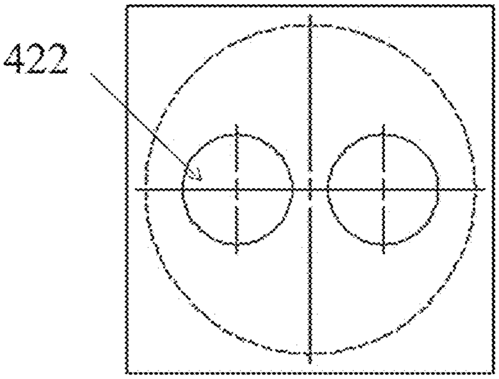
FIG. 4B is a schematic diagram illustrating an exemplary vibration component according to some embodiments of the present disclosure.
Figure 4C:
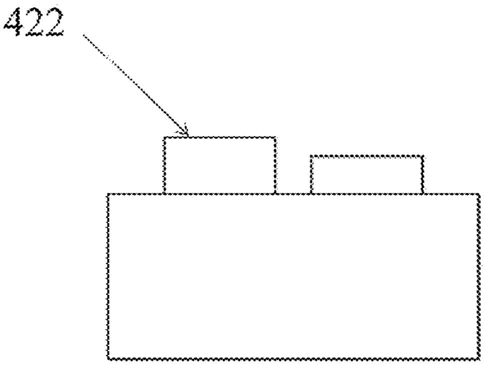
FIG. 4C is a schematic diagrams illustrating an exemplary vibration component according to some embodiments of the present disclosure.

FIGS. 4A-4C are schematic diagrams illustrating exemplary vibration components according to some embodiments of the present disclosure.

FIG. 4A is a three-dimensional schematic diagram of structures of a vibration component 420. FIG. 4B is a projection of the vibration component 420 shown in FIG. 4A in a vibration direction. FIG. 4C is a projection of the vibration component 420 shown in FIG. 4A in a direction perpendicular to the vibration direction. The vibration component shown in FIGS. 4A-4C may be an exemplary embodiment of the vibration component 120 shown in FIG. 1.

As shown in FIG. 4A, in some embodiments, the vibration component 420 may include a plate structure and two mass blocks 422 arranged on the plate structure, similar to the vibration component 320 in FIG. 3. The plate structure may be a diaphragm 421 arranged on a supporting structure 430. In some embodiments, a plurality of structural parameters of the two mass blocks 422 may be the same or different. It should be noted that a count of the mass blocks connected with the diaphragm may not be limited to two, for example, a count of the mass blocks connected with the diaphragm may be three, four, or more.

In some embodiments, the two mass blocks 422 may be physically connected with the diaphragm 421. In some embodiments, the two mass blocks 422 may be arranged on both sides of the diaphragm 421 in the vibration direction, respectively. As shown in FIGS. 4B and 4C, in some embodiments, the two mass blocks 422 may have the same outer contour in the vibration direction. For example, the outer contours of the two mass blocks may both be circular. The two mass blocks 422 may have different heights in the horizontal direction (a direction perpendicular to the vibration direction). Therefore, the two mass blocks 422 may cause the vibration component to have two different resonance frequencies within the target frequency band, resulting in two resonance peaks, thereby improving the sensitivity of the vibration component 420 in the frequency range (i.e., the target frequency band) near the two resonance frequencies, achieving the effect of broadening the bandwidth of the frequency band and improving the sensitivity.

In some embodiments, by setting parameters of the diaphragm 421 and the mass blocks 422, at least two resonance peaks may be formed on a frequency response curve of the vibration sensor with vibration component 420, thereby forming multiple high sensitivity frequency ranges and wide frequency bands. In some embodiments, the plate structure and the multiple mass blocks 422 physically connected with the plate structure may have a plurality of resonance frequencies related to the parameters of the diaphragm 421 and/or the multiple mass blocks 422. The parameters may include at least one of: a modulus of the plate structure, a volume of a cavity formed between the transducer and the plate structure, radiuses of the multiple mass blocks 422, heights of the multiple mass blocks 422, or densities of the multiple mass blocks 422. Specifically, a mathematical relationship between a resonance frequency and a sensitivity with the above parameters may be described in formula (1) in the following descriptions. It should be noted that values of parameters including a mass or a size of a mass block 422 are not necessarily as large as possible. If the parameters of the mass block 422 is too great, a deformation of diaphragm 421 may be suppressed, or a new effective mode may generate due to a large amplitude of the mass block 422.

In some embodiments, the parameters of the two mass blocks 422, such as the heights in the vibration direction, may meet a preset ratio. In some embodiments, a ratio of the heights of the two mass blocks 422 may be 3:2, 2:1, 3:4, or 3:1, etc.

Figure 5A:
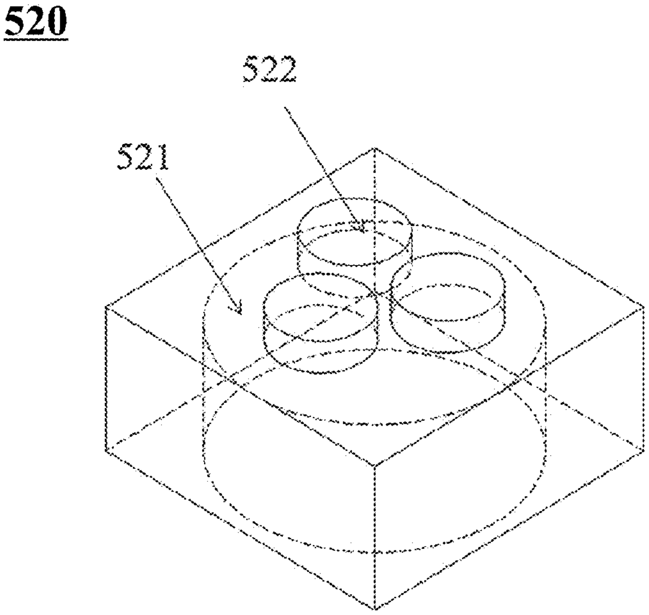
FIG. 5A is a schematic diagram illustrating an exemplary vibration component according to some embodiments of the present disclosure.
Figure 5B:
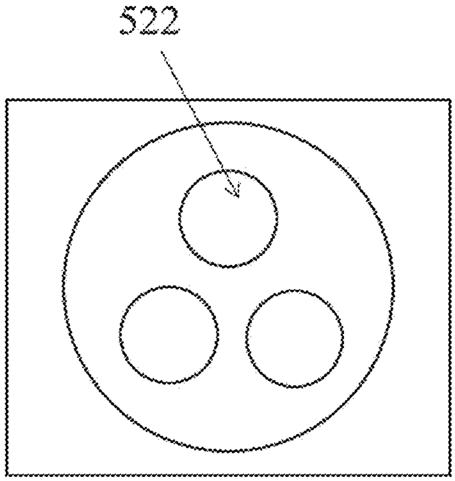
FIG. 5B is a schematic diagram illustrating an exemplary vibration component according to some embodiments of the present disclosure.

FIGS. 5A and 5B are schematic diagrams illustrating exemplary vibration components according to some embodiments of the present disclosure.

FIG. 5A is a three-dimensional schematic diagram of structures of a vibration component 520. FIG. 5B is a projection of the vibration component 520 shown in FIG. 5A in the vibration direction. In some embodiments, as shown in FIG. 5A, the vibration component 520 is similar to the vibration component 420, except that a count of mass blocks 522 on diaphragm 521 is three.

In some embodiments, three mass blocks 522 may not be arranged collinearly on the diaphragm 521. It should be understood that when the count of the mass blocks 522 is three, connecting lines between two of the three mass blocks may not coincide. As shown in FIG. 5B, in this embodiment, the three mass blocks 522 are distributed in a triangular shape, and distances between adjacent two mass blocks 522 of the three mass blocks 522 are the same. In some embodiments, the three mass blocks 522 may enhance the sensitivity of the vibration component 520 in the frequency range near at least two frequency points within the target frequency band, thereby achieving the effect of expanding the bandwidth of frequency band and improving the sensitivity.

Figure 6:
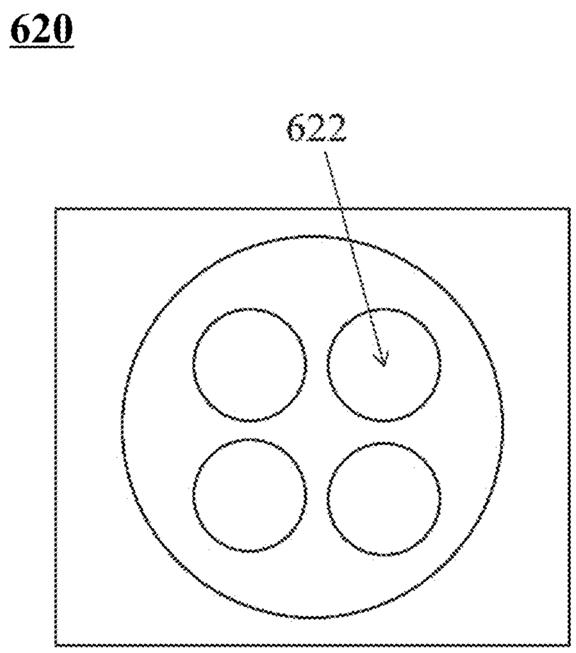
FIG. 6 is another schematic diagram illustrating an exemplary vibration component according to some embodiments of the present disclosure.

FIG. 6 is a schematic diagram illustrating an exemplary vibration component according to some embodiments of the present disclosure.

As shown in FIG. 6, in some embodiments, the count of the mass blocks 622 in the vibration component 620 may be four, and the four mass blocks 622 may be arranged in an array (e.g., a circular array or a rectangular array). In some embodiments, at least two of the four mass blocks 622 may have different resonant peaks. In some embodiments, when the count of the mass blocks 622 is four or more, connecting lines between any two mass blocks at a center point of the diaphragm may not overlap into a straight line.

In some embodiments, the frequency response curve of the vibration sensor under an action of the diaphragm and the mass blocks may include one or more resonance peaks.

Figure 7:
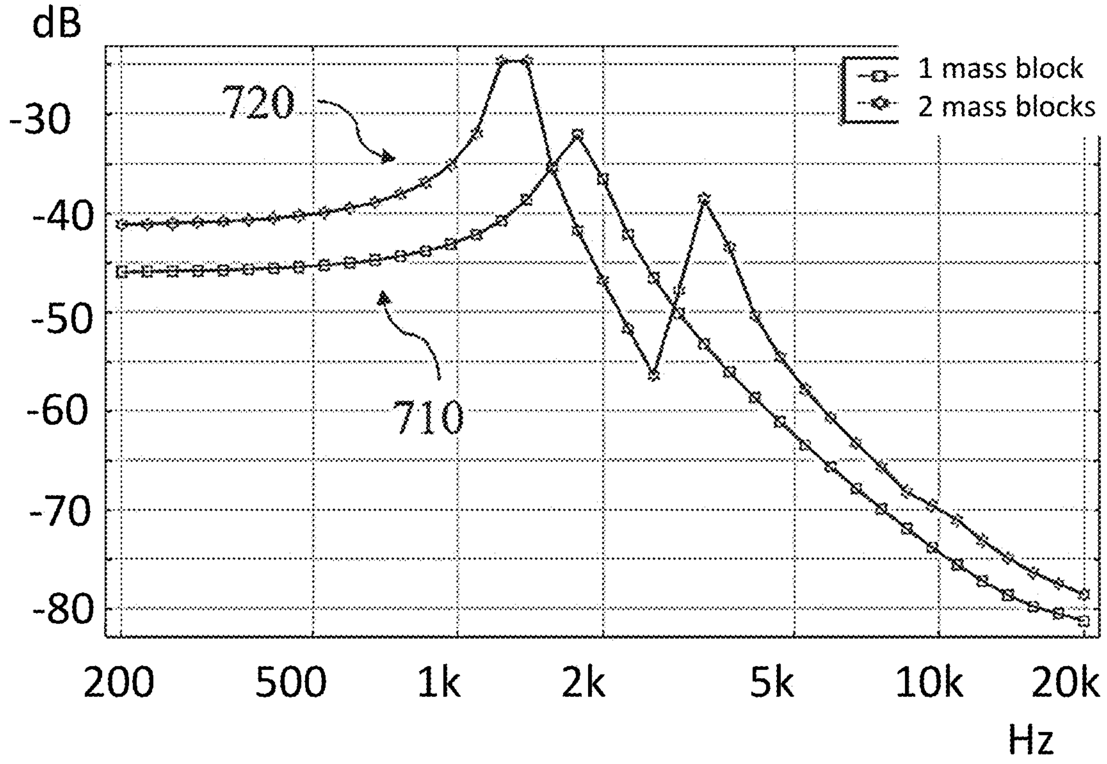
FIG. 7 is a schematic diagram illustrating exemplary frequency response curves of a vibration component with different counts of mass blocks in a vibration sensor according to some embodiments of the present disclosure.

FIG. 7 is a schematic diagram illustrating exemplary frequency response curves of a vibration component with different counts of mass blocks in a vibration sensor according to some embodiments of the present disclosure.

As shown in FIG. 7, there are two frequency response curves including a frequency response curve 710 and a frequency response curve 720. The frequency response curve 710 represents a frequency response curve of a vibration sensor when a mass block is arranged on a diaphragm (as shown in FIG. 3). The frequency response curve 720 represents a frequency response curve of a vibration sensor when two mass blocks are arranged on a diaphragm (as shown in FIG. 4A). As shown in FIG. 7, the frequency response curve 710 has one resonant peak, and the frequency response curve 720 has two resonant peaks.

In some embodiments, the arrangement of a mass block may refer to the arrangement shown in FIG. 3, and the arrangement of two mass blocks may refer to the arrangement shown in FIG. 4A. As shown in FIG. 7, when one mass block is arranged on the diaphragm, the frequency of the resonance peak of the vibration sensor may be around 2000 Hz. When two mass blocks with the same diameter and different heights are arranged on the diaphragm, the resonance peaks of the vibration sensor may be around 1300 Hz and 3500 Hz, respectively. It could be seen that in the situation of arranging two mass blocks on the diaphragm, the sensitivity at two frequency points (points around 1300 Hz and 3500 Hz) may be greater than the sensitivity of the transducer, thereby achieving a significant improvement in the sensitivity of the vibration sensor at the target frequency (e.g., the target frequency may be in the range of 500 Hz to 5000 Hz). Compared with a method for increasing the receiving frequency range by adding multiple transducers with different resonant peaks, the above method of adding a count of mass blocks may reduce a volume of the whole device, reduce costs, and enable the device to have good performance on the basis of high integration.

In some embodiments, the resonance frequency of the plate structure and one or more mass blocks on the plate structure may be related to parameters of the plate structure and/or the one or more mass blocks. The parameters may include at least one of: a modulus of the plate structure, a volume of a cavity formed between the transducer and the plate structure, radiuses of the one or more mass blocks, heights of the one or more mass blocks, or densities of the one or more mass blocks. In some embodiments, a relationship between the resonance frequency and the sensitivity of the diaphragm and the one or more mass blocks may be expressed as:

$$(S,f)=9(K_{film},K_{foam},V_{cavity},R_m,h_m,\rho_m) \quad (1)$$

Where S denotes a sensitivity of the vibration sensor with a vibration component, f denotes a resonance frequency of a vibration component, $K_{film}$ denotes a stiffness of a plate structure, $K_{foam}$ denotes a stiffness of a supporting structure, $V_{cavity}$ denotes a volume of a cavity, $R_m$ denotes a radius of a mass block, $h_m$ denotes a height of a mass block, and $\rho_m$ denotes a density of a mass block. The $V_{cavity}$ denotes a volume of a cavity formed by a sensitive element (e.g., pickup device 212 shown in FIG. 2) of a transducer and a diaphragm of a vibration component closet to the transducer.

Specifically, in some embodiments, the sensitivity S may decrease with the increase of the stiffness $K_{film}$ of the plate structure. The sensitivity S may decrease with the increase of the stiffness $K_{foam}$ of the supporting structure. The sensitivity S may increase first and then decrease with the increase of the $V_{activity}$, may increase first and then decrease with the increase of the radius $R_m$ of the mass block. The sensitivity S may increase with the increase of the height $h_m$ of the mass block. The sensitivity S may increase with the increase of the density of the mass block $\rho_m$. The resonance frequency f of the vibration component may increase with the increase of the stiffness $K_{film}$ of the plate structure. The resonance frequency f of the vibration component may increase with the increase of the stiffness $K_{foam}$ of the supporting structure. The resonance frequency f of the vibration component may increase first and then decrease with the increase of the radius $R_m$ of the mass block. The resonance frequency f of the vibration component may decrease with the increase of the height $h_m$ of the mass block. The resonance frequency f of the vibration component may decrease with the increase of the density of the mass block $\rho_m$. In some embodiments, the sensitivity and the resonance frequency may be adjusted by controlling the stiffness of the plate structures, the volume of the cavity, and a material and a size of the mass block. In some embodiments, when the stiffness of the plate structure is low, the plate structure may be set in the form of a diaphragm, which may be described in FIG. 2. In some embodiments, when the stiffness of the plate structure is great or an expectant volume of the plate structure is small, the plate structure may be set in the form of a cantilever beam, which may be described in FIGS. 8A-8C in the following descriptions.

Figure 8A:
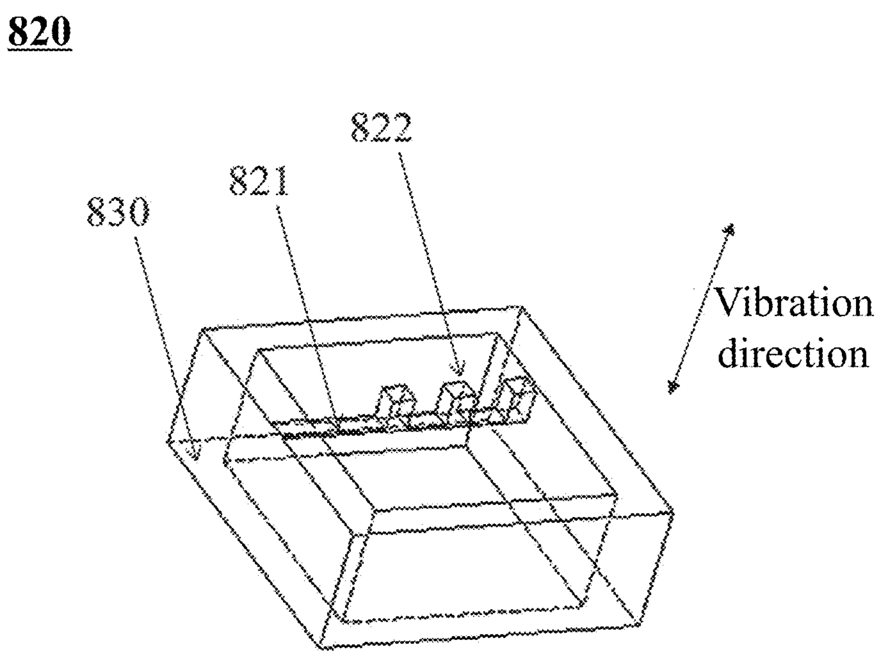
FIG. 8A is a schematic diagram illustrating exemplary structures of a vibration component in a vibration sensor according to some embodiments of the present disclosure.
Figure 8B:
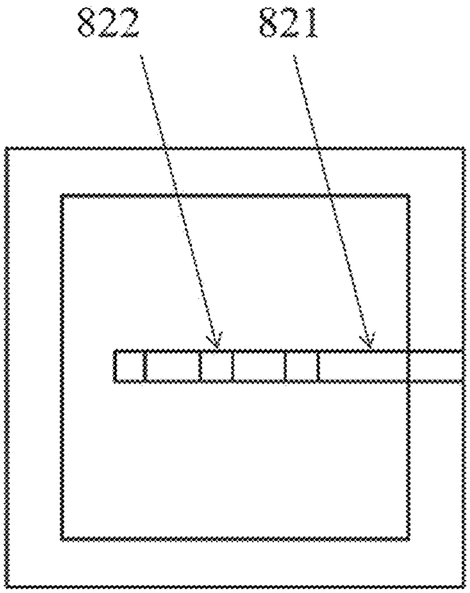
FIG. 8B is a schematic diagram illustrating exemplary structures of a vibration component in a vibration sensor according to some embodiments of the present disclosure.
Figure 8C:
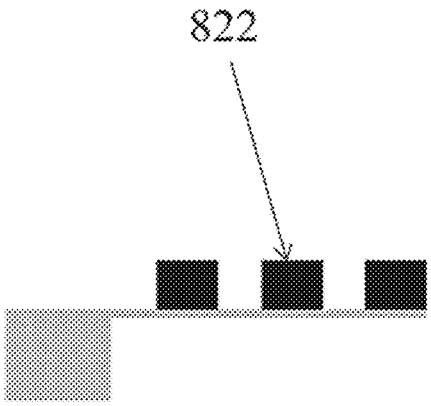
FIG. 8C is a schematic diagram illustrating exemplary structures of a vibration component in a vibration sensor according to some embodiments of the present disclosure.

FIGS. 8A-8C are schematic diagrams illustrating exemplary structures of a vibration component in a vibration sensor according to some embodiments of the present disclosure.

FIG. 8A is a three-dimensional schematic diagram of structures of a vibration component 820. FIG. 8B is a projection of the vibration component 820 shown in FIG. 8A in a vibration direction. FIG. 8C is a projection of the vibration component 820 shown in FIG. 8A in a direction perpendicular to the vibration direction. The vibration component shown in FIGS. 8A-8C may be exemplary embodiments of the vibration component 120 shown in FIG. 1.

As shown in FIG. 8A, the vibration component may include a supporting structure 830, a cantilever beam 821, and a mass block 822. An end of the cantilever beam 821 may be physically connected with one side of the supporting structure 830, and another end of the cantilever beam 821 may be a free end. The mass block 822 may be physically connected with the free end of the cantilever beam 821. Specifically, the connection between the cantilever beam 821 and the supporting structure 830 may include welding, clamping, bonding, or integrated forming, which may not be limited herein. In some embodiments, the vibration component may not include the supporting structure 830. The cantilever beam 821 may be located inside or outside a conduction channel along the radial cross-section of the conduction channel, and the cantilever beam 821 may not fully cover the conduction channel.

In some embodiments, a material of the cantilever beam 821 may include at least one of copper, aluminum, tin, silicon, silicon oxide, silicon nitride, silicon carbide, aluminum nitride, zinc oxide, lead zirconate titanate, or alloy. In some embodiments, the mass block 822 may be arranged on either side of the cantilever beam 821 in the vibration direction. In this embodiment, the mass block 822 may be arranged on one side of the cantilever beam 821 in the vibration direction away from the transducer (not shown).

In some embodiments, at least one mass block 822 may be provided on either side of the free end of the cantilever beam 821 in a direction perpendicular to the vibration direction. Sizes of the plurality of mass blocks 822 may be partially same, completely same, or completely different. In some embodiments, distances between adjacent two mass blocks 822 of the multiple mass blocks 822 may be the same or different. In practical use, the design of the multiple mass block may be based on a vibration mode.

As shown in FIGS. 8A-8C, in some embodiments, three mass blocks 822 may be arranged on the cantilever beam 821. The three mass blocks 822 on cantilever beam 821 may have the same size, and may be collinear at the center point of the cantilever beam 821. In some embodiments, due to a narrow width of the cantilever beam 821 in a horizontal direction perpendicular to the vibration direction, one or more mass blocks 822 may be collinear with the cantilever beam 821 to enhance the sensitivity more stably.

In some embodiments, the cantilever beam 821 may have a rectangular profile on the radial section. In some other embodiments, the cantilever beam 821 may have rectangular, triangular, trapezoidal, diamond, and other curved shapes on the radial section. In some embodiments, positions of multiple resonance peak of the vibration sensor may be adjusted by changing materials, shapes, and sizes of the cantilever beam 821 and the mass block 822. Since the principle of using a cantilever beam or a diaphragm as a plate structure is similar, the specific adjustment method may be found in the formula (1) in above descriptions. The parameters of the diaphragm in formula (1) may be directly replaced by parameters of the cantilever beam 821.

In some embodiments, the vibration sensor may be applied to the design of MEMS devices. In some embodiments, the vibration sensor may be applied to the design of macroscopic devices, such as microphones, speakers, etc. In the technology of MEMS device, a material of the cantilever beam 821 may be a single layer material along the thickness direction, such as Si, SiO2, SiNx, SiC, etc., and may be a double or multi-layer composite material, such as Si/SiO2, SiO2/Si, Si/SiNx, SiNx/Si/SiO2, etc. A material of the mass block 822 may be a single-layer material, such as Si, Cu, etc., or a double-layer or multi-layer composite material, such as Si/SiO2, SiO2/Si, Si/SiNx, SiNx/Si/SiO2, etc. The material of the cantilever beam 821 may be Si or SiO2/SiNx, and the material of the mass block 822 may be Si in the MEMS devices in the present disclosure. In the technology of MEMS device, in some embodiments, a length of cantilever beam 821 may be 500 μm~1500 μm. In some embodiments, a thickness of the cantilever beam 821 may be 0.5 μm~5 μm. In some embodiments, a side length of the mass block 822 may be 50 μm~1000 μm. In some embodiments, a height of the mass block 822 may be 50 μm~5000 μm. In some embodiments, the length of the cantilever beam 821 may be 700 μm~1200 μm. The thickness of the cantilever beam 821 may be 0.8 μm~2.5 μm. The side length of the mass block 822 may be 200 μm~600 μm. The height of the mass block 822 may be 200 μm~1000 μm.

In macroscopic devices, the material of the cantilever beam 821 may be an inorganic non-metallic material, such as aluminum nitride, zinc oxide, lead zirconate titanate, etc., or a metallic material, such as copper, aluminum, tin, or other alloys, or any combination thereof. The mass block 822 may be required to have a certain amount of mass in a smallest possible volume, thus the material of the mass block 822 requiring a high density. The material of the mass block may be copper, tin, or other alloys, or ceramic material. Preferably, the material of the cantilever beam 821 may be aluminum nitride or copper, and the material of the mass block 822 may be tin or copper. In macroscopic devices, the length of the cantilever beam 821 may be 1 mm~20 cm, and the thickness of the cantilever beam 821 may be 0.1 mm~10 mm. In some embodiments, the side length of the mass block 822 may be 0.2 mm~5 cm, and the height of the mass block 822 may be 0.1 mm~10 mm. In some embodiments, the length of the cantilever beam 821 may be 1.5 mm~10 mm, and the thickness of the cantilever beam 821 may be 0.2 mm~5 mm. The side length of the mass block 822 may be 0.3 mm~5 cm, and the height of the mass block 822 may be 0.5 mm~5 cm.

Figure 9A:
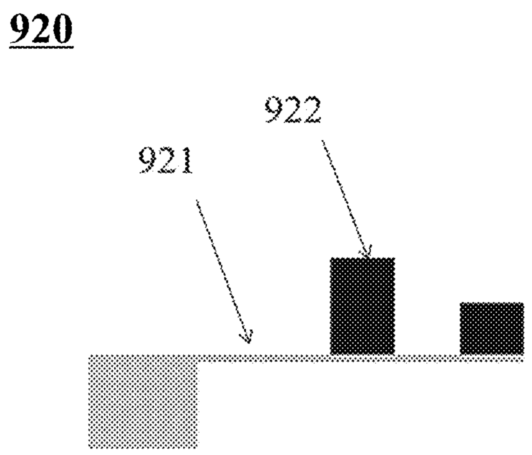
FIG. 9A is a schematic diagram illustrating exemplary structures of a vibration component in a vibration sensor according to some embodiments of the present disclosure.
Figure 9B:
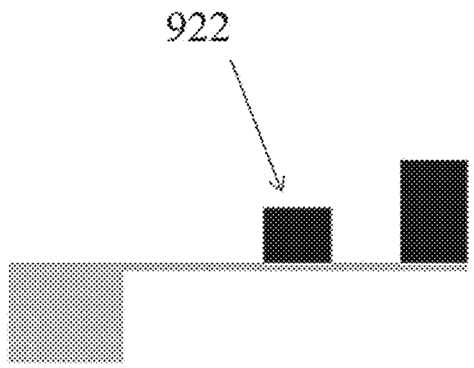
FIG. 9B is a schematic diagrams illustrating exemplary structures of a vibration component in a vibration sensor according to some embodiments of the present disclosure.

FIGS. 9A and 9B are schematic diagrams illustrating exemplary structures of vibration components in vibration sensors according to some embodiments of the present disclosure.

As shown in FIG. 9A, in some embodiments, two mass blocks 922 may be arranged on the cantilever beam 921 of the vibration component 920, and the two mass blocks 922 may have different heights in the vibration direction. In some embodiments, a height of a mass block 922 near a free end of the cantilever beam 921 may be lower than a height of a mass block 922 far from the free end. In some embodiments, as shown in FIG. 9B, the height of the mass block 922 near the free end of the cantilever beam 921 may be higher than the height of the mass block 922 far from the free end. It should be noted that even if the other structural parameters of the two mass blocks 922 are the same, due to the different positions of the mass blocks 922 in FIG. 9A and FIG. 9B, in some embodiments, the two situations may have two different forms of resonant peaks.

Figure 10:
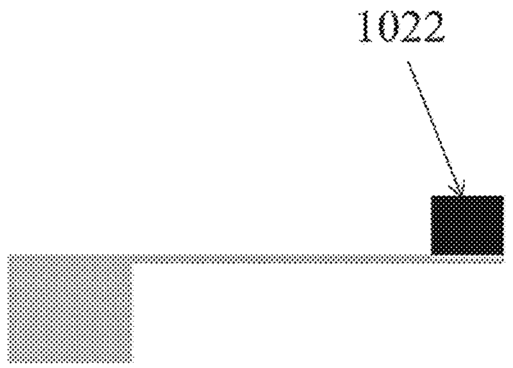
FIG. 10 is a schematic diagram illustrating exemplary structures of a vibration component in a vibration sensor according to some embodiments of the present disclosure.
Figure 11:
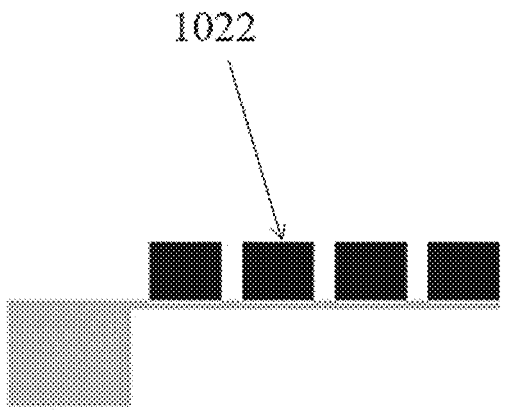
FIG. 11 is a schematic diagram illustrating exemplary structures of a vibration component in a vibration sensor according to some embodiments of the present disclosure.

FIG. 10 is a schematic diagram illustrating exemplary structures of a vibration component in a vibration sensor according to some embodiments of the present disclosure;

FIG. 11 is schematic diagram illustrating exemplary structures of a vibration component in a vibration sensor according to some embodiments of the present disclosure.

As shown in FIGS. 10 and 11, in some embodiments, a count of the mass block 1022 on the cantilever beam may be one or four. The structural parameters of the four mass blocks 1022 arranged on the cantilever beam may be the same, partially different, or all different.

Figure 12:
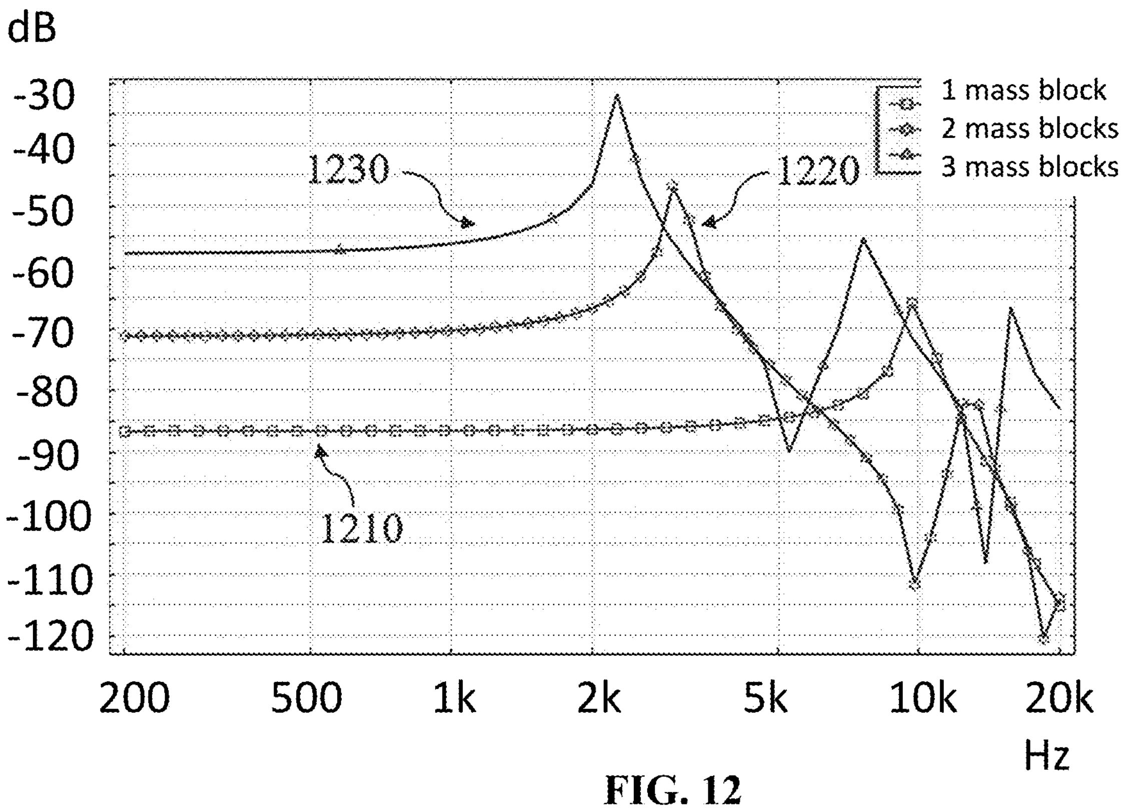
FIG. 12 is a schematic diagram illustrating exemplary frequency response curves of a vibration component with different counts of mass blocks in a vibration sensor according to some embodiments of the present disclosure.

FIG. 12 is a schematic diagram illustrating exemplary frequency response curves of a vibration component with different counts of mass blocks in a vibration sensor according to some embodiments of the present disclosure.

As shown in FIG. 12, in some embodiments, a frequency response curve of the vibration sensor under an action of a cantilever beam and one or more mass blocks may have one or more resonance peaks. Three frequency response curves are shown in FIG. 12: a frequency response curve 1210, a frequency response curve 1220, and a frequency response curve 1230. The frequency response curve 1210 represents a frequency response curve of the vibration sensor when a mass block is arranged on the cantilever beam (as shown in FIG. 10). The frequency response curve 1220 represents a frequency response curve of the vibration sensor when two mass blocks are arranged on the cantilever beam (as shown in FIG. 9A or 9B). The frequency response curve 1230 represents a frequency response curve of the vibration sensor when three mass blocks are arranged on the cantilever beam (as shown in FIG. 8A). As shown in FIG. 12, the frequency response curve 1210 has one resonance peak, the frequency response curve 1220 has two resonance peaks, and the frequency response curve 1230 has three resonance peaks.

In some embodiments, the arrangement of the one or more mass blocks on the cantilever beam may refer to the above-mentioned descriptions, for example, the arrangement of a mass block may refer to FIG. 10. The arrangement of the three mass blocks may be referred to FIG. 8A. As shown in FIG. 12, when there is only one mass block, the resonance peak of the vibration sensor may be around 10 kHz. However, when there are two resonance peaks, the vibration sensor may form two resonance peaks around 3 kHz and 13 kHz. By arranging two mass blocks, the sensitivity of the vibration sensor may be significantly improved within the target frequency band (e.g., a range of 2 kHz~15 kHz) near the two frequency points. When three mass blocks are arranged on the same cantilever beam, the vibration sensor may form three resonance peaks. Specifically, three resonance peaks may be formed at three frequency points of 2250 Hz, 7600 Hz, and 15700 Hz, thus significantly improving the sensitivity of the vibration sensor within the target frequency band near these three frequency points (e.g., 1 kHz~20 kHz). The frequency response curve may be naturally divided into three different frequency bands, which may be beneficial for subsequent signal processing. Furthermore, as shown in FIG. 12, since an increase of the count of the mass blocks, the sensitivity of the vibration sensor may improve. For example, when the frequency response curve 1230 is in a low frequency range (i.e., a frequency is lower than 1 kHz), the sensitivity of the vibration sensor is still greater than the frequency response curve 1210. Thus, after arranging the plate structure and mass blocks reasonably, the bandwidth of the frequency band with high sensitivity may be expanded and the sensitivity of the vibration sensor within the target frequency band may be improved.

In some embodiments of the present disclosure, a sound input device may also be provided, which may include a sensor described in the aforementioned embodiments. The sensor may convert a vibration signal into an electrical signal for further processing.

Figure 13:
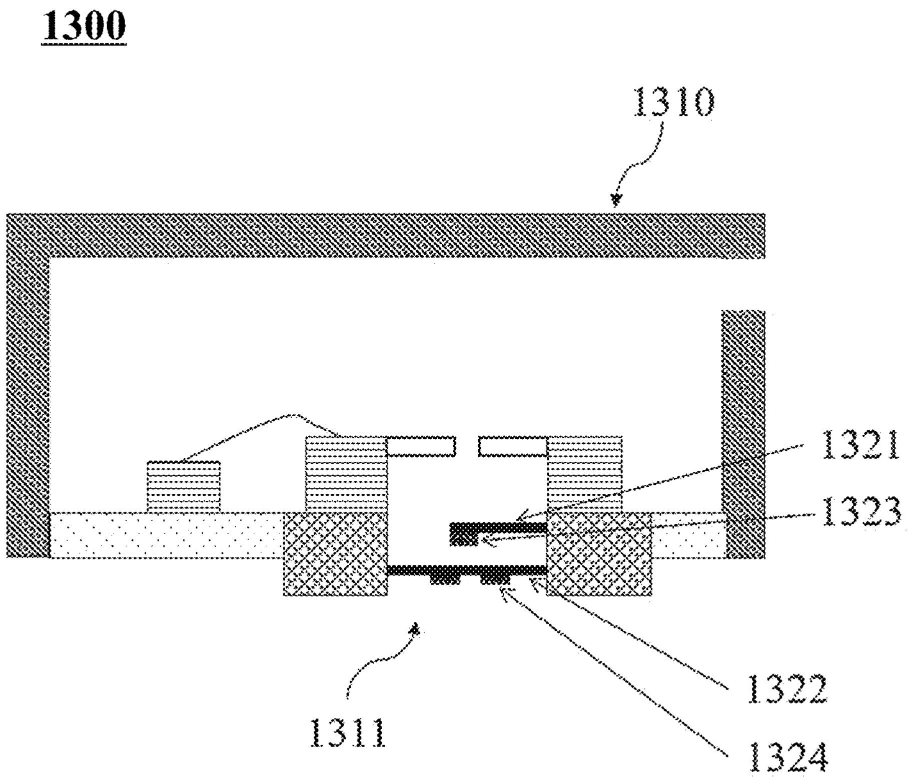
FIG. 13 is a schematic diagram illustrating exemplary structures of a vibration sensor according to some embodiments of the present disclosure.

FIG. 13 is a schematic diagram illustrating exemplary structures of a vibration sensor according to some embodiments of the present disclosure.

As shown in FIG. 13, a vibration sensor 1300 may be a specific implementation of vibration sensor 100 shown in FIG. 1. In some embodiments, the vibration sensor 1300 may include an acoustic transducer 1310 and a vibration component. The vibration component may include a cantilever beam 1321, a mass block 1323, a diaphragm 1322, and a plurality of mass blocks 1324 in a direction away from the acoustic transducer 1310 in a conduction channel 1311. In some embodiments, the diaphragm 1322 may be either a breathable or an impermeable membrane, for example, the diaphragm 1322 may be an impermeable membrane. In some embodiments, the cantilever beam 1321 may also be arranged on a side of the diaphragm 1322 away from the acoustic transducer 1310. In this embodiment, the diaphragm 1322 may be a breathable membrane.

In some embodiments, the cantilever beam 1321 and the mass block 1323 may correspond to a resonance frequency. The diaphragm 1322 and the plurality of mass blocks 1324 may correspond to one or two resonance frequencies. In some embodiments, the aforementioned three resonance frequencies may be set to different frequencies, thereby resulting in three resonance peaks in the frequency response curve of the vibration sensor under an action of the vibration component 1300, and forming multiple frequency ranges with high sensitivity and wide frequency bands.

Figure 14:
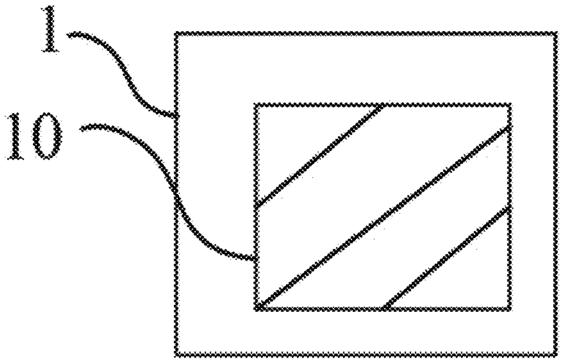
FIG. 14 is a block diagram illustrating an exemplary headphone according to some embodiments of the present disclosure.

FIG. 14 is a block diagram illustrating an exemplary headphone according to some embodiments of the present disclosure.

As shown in FIG. 14, the headphone 1 may include a vibration system 10 for receiving vibrations (e.g., picking up sound) for further processing. The vibration system 10 may be the vibration component 120 in the vibration sensor 100 shown in FIG. 1.

Other functional components of the headphone 1 may be refer to a general headphone, which may not be described herein.

The above scheme may form at least two resonance peaks on the frequency response curve through reasonable design of the vibration component, thereby forming multiple frequency ranges with high sensitivity and wide frequency bands.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms “one embodiment,” “an embodiment,” and/or “some embodiments” mean that a particular feature, structure or characteristic described in connection with the embodiment is included in at least one embodiment of the present disclosure. Therefore, it is emphasized and should be appreciated that two or more references to “an embodiment” or “one embodiment” or “an alternative embodiment” in various portions of the present disclosure are not necessarily all referring to the same embodiment. Furthermore, the particular features, structures or characteristics may be combined as suitable in one or more embodiments of the present disclosure.

In addition, those skilled in the art can understand that various aspects of the present disclosure can be explained and described through several patentable types or situations, including any new and useful processes, machines, products, or combinations of substances, or any new and useful improvements to them. Correspondingly, all aspects of the present disclosure can be fully executed by hardware, software (including firmware, resident software, microcode, etc.), or a combination of hardware and software. The above hardware or software can be referred to as “data blocks”, “modules”, “engines”, “units”, “components”, or “systems”. In addition, various aspects of the present disclosure may manifest as computer products located in one or more computer-readable media, including computer-readable program encoding.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A vibration sensor, including:

a transducer; and a vibration component connected with the transducer, wherein the transducer further includes a conduction channel;

the vibration component is arranged within the conduction channel along a radial cross-section of the conduction channel;

the vibration component is configured to transmit an external vibration signal to the transducer to generate an electrical signal, and includes one or more plate structures and one or more mass blocks physically connected with each of the one or more plate structures, wherein the one or more plate structures include a cantilever beam, a mass block of the one or more mass blocks, a diaphragm, and a plurality of mass blocks of the one or more mass blocks in sequence in a direction away from the transducer in the conduction channel; and the vibration component is further configured to make a sensitivity of the vibration sensor greater than a sensitivity of the transducer within one or more target frequency bands, wherein a frequency response curve of the vibration sensor under an action of the vibration component includes a plurality of resonance peaks.

2. The vibration sensor of claim 1, wherein the one or more mass blocks connected with each of the one or more plate structures include at least two mass blocks.

3. The vibration sensor of claim 1, wherein in a vibration direction of the vibration component, a projection of the one or more mass blocks is located within a projection of the one or more plate structures.

4. The vibration sensor of claim 1, wherein the vibration component further includes a supporting structure configured to support the one or more plate structures, the supporting structure is physically connected with the transducer, and the one or more plate structures are connected with the supporting structure.

5. The vibration sensor of claim 4, wherein the support structure is made of an impermeable material.

6. The vibration sensor according to claim 4, wherein a projection region of the one or more mass blocks does not overlap with a projection region of the supporting structure in a vertical direction with respect to a surface, wherein the one or more plate structures and the one or more mass blocks are connected at the surface.

7. The vibration sensor of claim 2, wherein one of the one or more plate structures and at least two mass blocks physically connected with the plate structure correspond to multiple target frequency bands of the one or more target frequency bands, so that the sensitivity of the vibration sensor is greater than the sensitivity of the transducer within the multiple target frequency bands of the one or more target frequency bands, wherein each target frequency band of the one or more target frequency bands is a frequency range of a resonance frequency corresponding to each of the one or more plate structures and the one or more mass blocks.

8. The vibration sensor of claim 1, wherein at least one mass block of the one or more mass blocks connected with one plate structure of the one or more plate structure is concentric with the plate structure.

9. The vibration sensor of claim 1, wherein at least one of the one or more plate structures includes the diaphragm.

10. The vibration sensor of claim 1, wherein at least one of the one or more plate structures includes the cantilever beam.

11. The vibration sensor of claim 10, wherein the one or more mass blocks connected with the cantilever beam are set at a free end of the cantilever beam.

12. The vibration sensor of claim 1, wherein the one or more mass blocks include at least three mass blocks, connecting lines between any two mass blocks of the at least three mass blocks at a center point of the diaphragm do not overlap into a straight line.

13. The vibration sensor of claim 1, wherein the one or more mass blocks include two mass blocks having different heights in a horizontal direction, the horizontal direction being perpendicular to the vibration direction.

14. A sound input device, comprising a vibration sensor, wherein the vibration sensor includes:

a transducer; and a vibration component connected with the transducer, wherein the transducer further includes a conduction channel;

the vibration component is arranged within the conduction channel along a radial cross-section of the conduction channel;

the vibration component is configured to transmit an external vibration signal to the transducer to generate an electrical signal, and includes one or more plate structures and one or more mass blocks physically connected with each of the one or more plate structures, wherein the one or more plate structures includes a cantilever beam, a mass block of the one or more mass blocks, a diaphragm, and a plurality of mass blocks of the one or more mass blocks in sequence in a direction away from the transducer in the conduction channel; and the vibration component is further configured to make a sensitivity of the vibration sensor greater than a sensitivity of the transducer within one or more target frequency bands, wherein a frequency response curve of the vibration sensor under an action of the vibration component includes a plurality of resonance peaks.

* * * * *